United States Patent
Gerphagnon

(10) Patent No.: US 12,316,773 B2
(45) Date of Patent: May 27, 2025

(54) METHOD OF MANAGING MESSAGE DELIVERY IN A COMPUTING INFRASTRUCTURE AND ASSOCIATED COMPUTING INFRASTRUCTURE

(71) Applicant: BULL SAS, Les Clayes-sous-Bois (FR)

(72) Inventor: Jean-Olivier Gerphagnon, Vif (FR)

(73) Assignee: BULL SAS, Les Clayes sous Bois (FR)

( * ) Notice: Subject to any disclaimer, the term of this patent is extended or adjusted under 35 U.S.C. 154(b) by 248 days.

(21) Appl. No.: 17/888,708

(22) Filed: Aug. 16, 2022

(65) Prior Publication Data

US 2023/0056478 A1 Feb. 23, 2023

(30) Foreign Application Priority Data

Aug. 17, 2021 (EP) .................................... 21191623

(51) Int. Cl.
*H04L 9/32* (2006.01)

(52) U.S. Cl.
CPC .......... *H04L 9/3247* (2013.01); *H04L 9/3297* (2013.01); *H04L 9/3236* (2013.01)

(58) Field of Classification Search
CPC .... H04L 9/3247; H04L 9/3297; H04L 9/3236
See application file for complete search history.

(56) References Cited

U.S. PATENT DOCUMENTS

| | | | | |
|---|---|---|---|---|
| 4,644,542 A * | 2/1987 | Aghili | ..................... | G06F 11/00 714/701 |
| 6,931,431 B2 * | 8/2005 | Cachin | ................. | H04L 9/3255 709/204 |
| 6,959,323 B1 * | 10/2005 | Tzeng | ..................... | H04L 47/34 709/205 |
| 10,304,143 B2 * | 5/2019 | Kasper | ................... | G06Q 40/12 |
| 10,742,732 B1 | 8/2020 | Lindeman et al. | | |
| 10,951,697 B2 * | 3/2021 | Brock | ....................... | H04L 9/50 |

(Continued)

FOREIGN PATENT DOCUMENTS

| | | |
|---|---|---|
| EP | 3471338 A1 | 4/2019 |
| WO | 2009052428 A1 | 4/2009 |

OTHER PUBLICATIONS

European Search Report issued in EP21191623.4, dated Feb. 10, 2022 (7 pages).

*Primary Examiner* — G. C. Neurauter, Jr.
(74) *Attorney, Agent, or Firm* — ARC IP Law, PC; Joseph J. Mayo

(57) ABSTRACT

A method for managing message delivery in a computing infrastructure. For each message to be delivered, the message is sent simultaneously by a transmitting component, to each server of a plurality of receiving servers. For each server that received the sent message, the server computes a signature specific to the message received, which is identical for each server, and the server sends the computed signature to a synchronization component. The sent signature is received by the synchronization component. If a first condition according to which the received signature is not stored in a signature database is met, the received signature is stored in the signature database and an instruction is sent to store or transmit the received message to the server by the synchronization component. Otherwise, the synchronization component sends an instruction to the server to delete the received message and the computed signature.

9 Claims, 1 Drawing Sheet

(56) References Cited

U.S. PATENT DOCUMENTS

| | | | | |
|---|---|---|---|---|
| 11,088,826 | B2* | 8/2021 | Kandiraju | H04L 9/3263 |
| 11,411,869 | B1* | 8/2022 | Subagio | H04L 47/125 |
| 11,461,502 | B2* | 10/2022 | Irvine | G06F 21/64 |
| 2018/0294957 | A1* | 10/2018 | O'Brien | G06F 21/105 |
| 2020/0403776 | A1* | 12/2020 | Oh | H04L 9/3247 |
| 2022/0407726 | A1* | 12/2022 | Zhang | H04L 9/50 |
| 2023/0056478 | A1* | 2/2023 | Gerphagnon | H04L 51/23 |
| 2023/0300000 | A1* | 9/2023 | Poustchi | H04L 69/40 |
| | | | | 370/431 |

* cited by examiner

METHOD OF MANAGING MESSAGE DELIVERY IN A COMPUTING INFRASTRUCTURE AND ASSOCIATED COMPUTING INFRASTRUCTURE

This application claims priority to European Patent Application Number 21191623.4, filed 17 Aug. 2021, the specification of which is hereby incorporated herein by reference.

BACKGROUND OF THE INVENTION

Field of the Invention

The technical field of one or more embodiments of the invention is that of computing infrastructures and more particularly that of message delivery management in computing infrastructures.

One or more embodiments of the invention related to a method for managing message delivery in a computing infrastructure. The present invention also relates to a computing infrastructure with message delivery management.

Description of the Related Art

In current computing infrastructures, each message is sent from a transmitting component to a receiving server that either retransmits the message or stores it for later analysis.

To ensure that the message has been received by the receiving server, it is common to set up an acknowledgement mechanism consisting of the transmitting component transmitting the message in a loop until it has received a message confirming receipt of the message by the receiving server.

However, such a mechanism is not compatible with complex computing infrastructures wherein several million messages are continuously exchanged, as the implementation of the acknowledgement mechanism causes the messages sent to each receiving server to proliferate, which creates a queue that can lead to the failure of the saturated receiving server.

There is currently no way to guarantee the correct reception of each message in a computing infrastructure without degrading its performance level. This lack of guarantee is even more problematic in the case of log messages used for diagnosing the computing infrastructure.

There is therefore a need to guarantee the delivery of every message in a computing infrastructure regardless of its size, while maintaining an acceptable level of performance.

BRIEF SUMMARY OF THE INVENTION

One or more embodiments of the invention offers a solution to the above-mentioned problems, by making it possible to guarantee the correct reception of each message within a computing infrastructure without significantly degrading its performance level.

At least one embodiment of the invention relates to a method for managing message delivery in a computing infrastructure, comprising the following steps for each message to be delivered:
  Simultaneous sending of the message by a transmitting component of the computing infrastructure, to each server of a plurality of receiving servers of the computing infrastructure;
  For each server of the plurality of receiving servers that received the sent message:
    Computing, by the server, of a signature specific to the message received, the computed signature being identical for each server;
    Sending by the server of the computed signature to a synchronization component;
    Receiving of the sent signature, and querying of a signature database, by the synchronization component:
      If a first condition according to which the received signature is not stored in the signature database is met, storing the received signature in the signature database and sending of an instruction to store or transmit the received message to the server by the synchronization component;
      Otherwise, sending by the synchronization component of an instruction to the server to delete the received message and the computed signature.

By virtue of at least one embodiment of the invention, each message to be delivered is duplicated and a duplicate of the message is sent to each server of a plurality of receiving servers. Since the message is sent to several receiving servers, the probability that it is not received, for example because of a failure of a receiving server, is thus considerably reduced compared to the prior art where the message is sent to a single receiving server, all without the need to set up an acknowledgement mechanism.

To avoid several duplicates of the same message being stored or retransmitted in the computing infrastructure and thus the same message being considered as several identical independent messages, which could be interpreted as a failure in the computing infrastructure, each server that has received the message computes a signature specific to the message that is identical for each server and sends it to a synchronization component. For each signature received, in one or more embodiments, the synchronization component queries a signature database to see if the signature is stored in the database. If the signature is not stored in the database, the synchronization component stores the received signature in the database and requests the storage or retransmission of the duplicate associated with the signature. If the signature is stored in the database, then a duplicate of the message has already been stored or retransmitted and the synchronization component therefore requests the deletion of the duplicate associated with the signature.

At least one embodiment of the invention thus makes it possible to guarantee the delivery of each message to be delivered without considerable proliferation of the messages exchanged in the computing infrastructure, and thus without significantly degrading the performance level of the computing infrastructure.

In addition to the features mentioned in the preceding paragraph, the method according to at least one embodiment of the invention may have one or more complementary features from the following, taken individually or according to all technically plausible combinations.

According to at least one embodiment, each message to be delivered is time-stamped.

Thus, two identical messages sent at different times are guaranteed to have different signatures.

According to at least one embodiment compatible with the previous one or more embodiments, each message to be delivered is a message relating to an event that took place in the computing infrastructure.

According to at least one embodiment compatible with the previous one or more embodiments, the signature computing step is carried out using a hashing algorithm.

Thus, in at least one embodiment, the uniqueness of the signature is guaranteed for a given message.

According to at least one embodiment variant compatible with the preceding one or more embodiments, the method according to the invention further comprises, upon receipt of the storage instruction by the server, a step of storing by the server the received message on a storage device of the computing infrastructure.

According to at least one embodiment compatible with the preceding one or more embodiments, the method according to the invention further comprises, upon receipt of the transmission instruction by the server, a step of the server transmitting the received message to a third-party component of the computing infrastructure.

According to at least one embodiment compatible with the preceding one or more embodiments, the method according to the invention further comprises, upon receipt of the deletion instruction by the server, a step of the server deleting the received message and the computed signature.

According to at least one embodiment compatible with the preceding one or more embodiments, the method according to the invention further comprises a step of erasing at least part of the signature database at regular time interval.

Thus, it is possible to use a simple hashing algorithm to compute signatures, that is ultra-fast but which has the disadvantage of generating duplicates within a relatively short period of time, of the order of one day. In addition, in one or more embodiments, the signature database is thereby small, which makes it possible to speed up the verification of the first condition, since the fewer entries in the signature database, the faster the verification.

At least one embodiment of the invention relates to a computing infrastructure with message delivery management, comprising at least one transmitting component, at least one plurality of receiving servers, at least one synchronization component, and at least one signature database, the transmitting component being configured to simultaneously send at least one message to each server of the plurality of receiving servers, each server of the plurality of servers being configured to, upon receipt of a message sent by the transmitting component, compute a signature specific to the received message, the computed signature being identical for each server of the plurality of receiving servers, and then to send the computed signature to the synchronization component, the synchronization component being configured to receive each signature sent by one server of the plurality of receiving servers, to query the signature database to determine whether each received signature is stored in the signature database, to store each received signature not stored in the signature database, to send a storage or transmission instruction to each server that sent a signature not stored in the signature database, and to send a deletion instruction to each server that sent a signature stored in the signature database.

According to at least one embodiment, the synchronization component is a separate server from each of the plurality of receiving servers or comprises for each server of the plurality of receiving servers, a synchronization module comprised in the server, each synchronization module being configured to communicate with the other synchronization modules of the synchronization component.

According to at least one embodiment compatible with the preceding one or more embodiments, the computing infrastructure according to the invention further comprises a storage device, each server of the plurality of receiving servers being further configured to store the computed signature on the storage device upon receipt of a storage instruction sent by the synchronization component.

According to at least one embodiment compatible with the preceding one or more embodiments, the computing infrastructure according to the invention further comprises a third-party component, each server of the plurality of receiving servers being further configured to transmit the received message to the third-party component upon receipt of a transmission instruction sent by the synchronization component.

According to at least one embodiment compatible with the preceding one or more embodiments, each server of the plurality of receiving servers is further configured to delete the received message and the computed signature upon receipt of a deletion instruction sent by the synchronization component.

One or more embodiments of the invention and its different applications will be better understood upon reading the following disclosure and examining the accompanying figures.

BRIEF DESCRIPTION OF THE DRAWINGS

The figures are presented by way of reference and are in no way limiting to one or more embodiments of the invention.

DETAILED DESCRIPTION OF THE INVENTION

Unless otherwise stated, the same element appearing in different figures has the same reference.

At least one embodiment of the invention relates to a method for managing message delivery in a computing infrastructure.

The messages to be delivered can correspond to all the messages exchanged within the computing infrastructure or to at least one particular type of messages, for example messages relating to events that have taken place in the computing infrastructure, called logs, or even alert messages.

Regardless of the type of message, each message contains information relating to its origin, information relating to its destination and content to be transmitted.

Each message can furthermore comprise a piece of information relating to a time-stamp.

At least one embodiment of the invention relates to a computing infrastructure with message delivery management.

In particular, the computing infrastructure according to one or more embodiments of the invention is suitable for implementing the method according to the invention.

Figure 2:
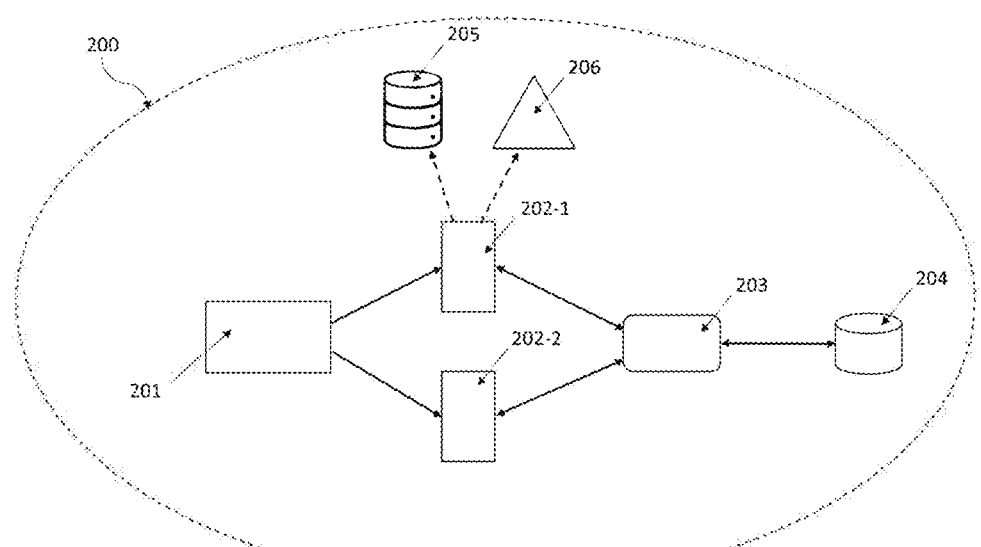
FIG. 2 shows a schematic representation of a computing infrastructure according to one or more embodiments of the invention.

FIG. 2 shows a schematic representation of a computing infrastructure 200 according to one or more embodiments the invention.

The computing infrastructure 200 according to one or more embodiments of the invention comprises:

At least one transmitting component 201;
At least one plurality of receiving servers 202-1, 202-2;
At least one synchronization component 203;
At least one signature database 204.

The transmitting component 201 can be any type of component capable of sending a message, for example a hardware component such as a server, a router or even a switch.

Each message to be delivered is associated, via the information relating to its origin, with a given transmitting component 201 that is to send the message to be delivered and is associated, via the information relating to its destination, with a given plurality of receiving servers to which the message to be delivered must be sent.

The transmitting component 201 may send multiple messages for delivery, each associated with different pluralities of receiving servers. For example, in one or more embodiments, the transmitting component 201 may send a first message to a first plurality of receiving servers and a second message to a second plurality of receiving servers.

The plurality of receiving servers comprises at least two servers 202-1, 202-2 and each server 202-1, 202-2 comprises at least one memory.

In FIG. 2, according to one or more embodiments, the plurality of receiving servers comprises two servers 202-1, 202-2.

According to at least one embodiment, the synchronization component 203 is a server not comprised in the plurality of receiving servers and therefore not intended to receive the messages to be delivered.

According to at least one embodiment, the synchronization component 203 comprises one synchronization module per server 202-1, 202-2 of the plurality of receiving servers and each synchronization module is capable of communicating with the other synchronization modules comprised in the synchronization component 203.

The synchronization component 203 is highly available.

The computing infrastructure 200 may also comprise at least one storage device 205.

The storage device 205 is for example intended for storing messages exchanged in the computing infrastructure 200.

The storage device 205 comprises for example at least one disk, such as a Non-Volatile Memory Express (NVME) or Solid-State Drive (SSD) disk.

The computing infrastructure 200 may also comprise at least one third-party component 206 separate from the transmitting component 201 and the servers 202-1, 202-2 of the plurality of receiving servers.

The third-party component 206 is for example a server intended for managing message storage in the computing infrastructure 200.

The signature database 204 is adapted to store at least one signature obtained from a message.

Figure 1:
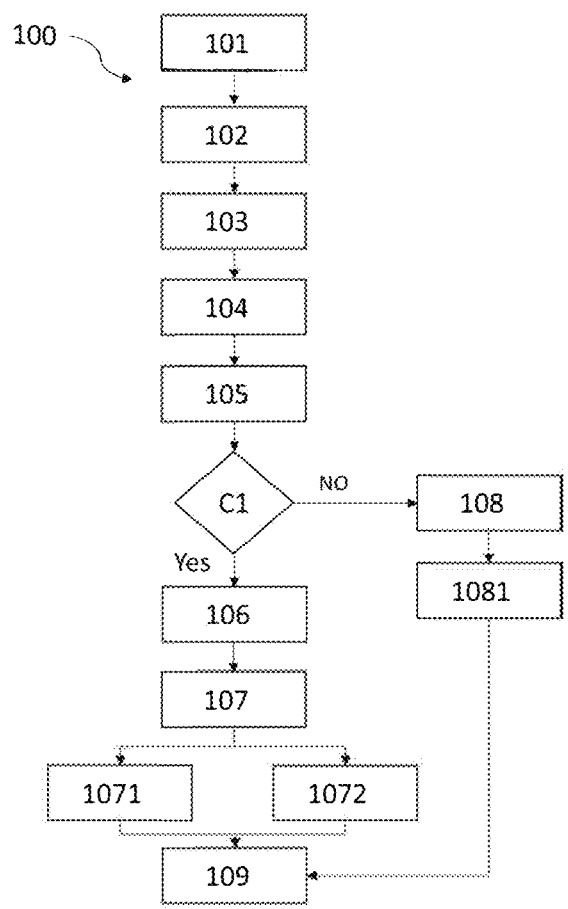
FIG. 1 is a block diagram showing the sequence of steps of a method according to one or more embodiments of the invention.

FIG. 1 is a block diagram showing the sequence of steps of the method 100 according to one or more embodiments of the invention.

The steps of the method 100 according to at least one embodiment of the invention are carried out for each message to be delivered.

A first step 101 of the method 100 is for the transmitting component 201 associated with the message to be delivered, that is having to deliver the message, to send the message to each server 202-1, 202-2 of the plurality of receiving servers associated with the message to be delivered, that is, to which the message to be delivered is to be sent.

The first step 101 thus comprises a substep of duplicating the message to be delivered to obtain as many duplicates of the message to be delivered as there are servers 202-1, 202-2 in the plurality of receiving servers.

The sending is carried out simultaneously, that is, each duplicate of the message to be delivered is sent simultaneously to each server 202-1, 202-2 of the plurality of receiving servers.

A second step 102 of the method 100 consists of each server 202-1, 202-2 of the plurality of receiving servers that received the message sent in the first step 101 computing a signature from the received message.

Upon receipt of the message, each server 202-1, 202-2 of the plurality of receiving servers stores the received message in its memory.

A signature uniquely identifies a message and is therefore different for each message to be delivered.

The signature is for example computed by applying a hashing algorithm to the received message.

The hashing algorithm should preferably be as fast as possible.

The hashing algorithm can use a cryptographic hash function, for example Message Digest 5 (MD5) or Secure Hashing algorithm (SHA).

The signature is computed in the same manner by each server 202-1, 202-2 of the plurality of receiving servers that received the message. Because each server 202-1, 202-2 of the plurality of receiving servers received a duplicate of the message, each server 202-1, 202-2 of the plurality of receiving servers computes the same signature in the second step 102, that is the computed signature is identical for each server 202-1, 202-2 of the plurality of receiving servers that received the message.

Once the signature is computed, according to one or more embodiments, each server 202-1, 202-2 of the plurality of receiving servers stores the computed signature in its memory.

A third step 103 of the method 100 is for each server 202-1, 202-2 of the plurality of receiving servers that computed a signature in the second step 102, to send the computed signature to the synchronization component 103.

The sending is carried out independently by each server 202-1, 202-2 of the plurality of receiving servers that computed a signature in the second step 102, according to one or more embodiments.

A fourth step 104 of the method 100 is for the synchronization component 203 to receive each signature sent in the third step 103.

Because the sending is carried out independently by each server 202-1, 202-2 of the plurality of receiving servers in the third step 103, the synchronization component 203 can receive each signature sent at a different time, and thus receive the signatures sent in a staggered fashion.

Upon receipt of a signature by the synchronization component 203, a fifth step 105 of the method 100 is carried out for the received signature, according to one or more embodiments.

The fifth step 105 consists of the synchronization component 203 querying the signature database 204 to test whether a first condition Cl related to the received signature is met.

The first condition Cl is met if the received signature is not stored in the signature database 204.

Conversely, in at least one embodiment, the first condition Cl is not met if the received signature is stored in the signature database 204.

If the first condition Cl is met for the received signature, a sixth step 106 and a seventh step 107 of the method 100 are carried out.

If the first condition Cl is not met for the received signature, an eighth step 108 is carried out.

The sixth step 106 of the method 100 is for the synchronization component 203 to store the signature in the signature database 204.

The first condition C1 is thus met for the signature received first by the synchronization component 103 among the signatures sent by each server 202-1, 202-2 of the plurality of receiving servers, that is, for the signature received at a first instant, and not met for the signatures received afterwards, that is for each signature received at an instant later than the first instant, since the signatures sent are identical and the signature received first was stored in the signature database 204 as soon as the first condition C1 was met.

The seventh step 107 of the method 100 is for the synchronization component 203 to send a storage or transmission instruction to the server 202-1, 202-2 of the plurality of receiving servers that sent the signature to the synchronization component 203.

The storage instruction is a message instructing the server 202-1, 202-2 of the plurality of receiving servers that sent the signature, to store the message based on which the signature was computed in the storage device 205.

The transmission instruction is a message instructing the server 202-1, 202-2 of the plurality of receiving servers that sent the signature to transmit the message based on which the signature was computed to the third-party component 206 of the computing infrastructure 200.

The seventh step 107 may then be followed by a step 1071 of storing by the server 202-1, 202-2 of the plurality of receiving servers that sent the signature, the message received on the storage device 205 upon receipt of the storage instruction, or by a step 1072 of transmitting by the server 202-1, 202-2 of the plurality of receiving servers that sent the signature, the message received to the third-party component 206.

The eighth step 108 of the method 100 is for the synchronization component 203 to send a deletion instruction to the server 202-1, 202-2 of the plurality of receiving servers that sent the signature to the synchronization component 203.

The deletion instruction is a message instructing the server 202-1, 202-2 of the plurality of receiving servers that sent the signature, to delete the received message and the signature computed based on the received message from its memory.

The eighth step 108 may then be followed by a step 1081 of deleting by the server 202-1, 202-2 of the plurality of receiving servers that sent the signature, the received message and the corresponding computed signature.

The duplicate of the message on the basis of which the signature received first by the synchronization component 103 was computed is then stored in the storage device 205 or retransmitted to the third-party component 206 and the duplicates of the message on the basis of which a signature received afterwards was computed are deleted.

In FIG. 2, according to one or more embodiments, the plurality of receiving servers comprises a first server 202-1 and a second server 202-2, both of which receive a duplicate of the message to be delivered sent by the transmitting component 201 in the first step 101.

The first server 202-1 and the second server 202-2 each independently compute a signature for the message received in the second step, the signature computed by the first server 202-1 being identical to the signature computed by the second server 202-2, and then each independently send the computed signature to the synchronization component 203 in the third step 103.

We are in the case where the signature sent by the first server 202-1 is received before the signature sent by the second server 202-2, by way of at least one embodiment.

Upon receipt of the signature sent by the first server 202-1, the synchronization component 203 queries the signature database 204 which does not contain the received signature which is specific to the message.

The synchronization component 203 then stores the received signature in the signature database 204 in the sixth step 106 and sends a storage or transmission instruction to the first server 202-1 in the seventh step 107.

If the first server 202-1 receives a storage instruction, in at least one embodiment, the first server 202-1 stores the message in the storage device 205 in step 1071, and if the first server 202-1 receives a transmission instruction, the first server 202-1 transmits the message to the third-party component 206 in step 1072, the alternative being represented by dotted lines in FIG. 2.

Upon receipt of the signature sent by the second server 202-2, in at least one embodiment, the synchronization component 203 queries the signature database 204 which contains the received signature since it is identical to the signature sent by the first server 202-1.

Thus, by way of one or more embodiments, the synchronization component 203 sends a deletion instruction to the second server 202-2 in the eighth step 108, and the second server 202-2 erases the received message and the computed signature from its memory in step 1081.

In the event that the signature sent by the first server 202-1 is received at the same time as the signature sent by the second server 202-2, the synchronization component 203 may apply a predefined rule as to which received signature it should process first.

For example, in at least one embodiment, each server 202-1, 202-2 of the plurality of receiving servers is assigned a different number and the predefined rule is to first process the signature received from the server 202-1, 202-2 of the plurality of receiving servers associated with the highest number among the numbers associated with the servers 202-1, 202-2 of the plurality of receiving servers that sent the signature at the same time.

The method 100 according to one or more embodiments of the invention may also comprise a ninth step 109 of erasing at least a portion of the signature database 204 at regular interval.

The duration of the interval is for example one day, preferentially one hour. The ninth step 109 is then to erase entries from the signature database 204 stored in the signature database more than one day ago or more than one hour ago.

What is claimed is:

1. A method for managing a delivery of messages, each message of said messages being associated via a piece of information relating to an origin of said each message, with a transmitting component that is to send the each message and is associated via a piece of information relating to a destination of said each message, with a plurality of receiving servers to which the each message is to be sent, in a computing infrastructure that comprises a storage device, wherein for said each message to be delivered, the method comprises:

sending a message of the messages, simultaneously by the transmitting component of the computing infrastructure, to each server of the plurality of receiving servers of the computing infrastructure,
wherein the message that is sent simultaneously by the transmitting component is a same identical message with an identical timestamp and identical content sent to the each server of the plurality of receiving servers,
such that said each server of the plurality of receiving servers receives a duplicate of said message, and
wherein the same identical message that is sent to all of the plurality of receiving servers comprises the piece of information relating to the origin of the message from the transmitting component and the piece of information relating to the destination of the message from the plurality of receiving servers;
for said each server of the plurality of receiving servers that receives the message that is sent and that stores the message that is received in a memory of said each server,
computing by the each server a signature specific to the message that is received, the signature that is computed being identical for said each server,
wherein said signature that is computed by said each server is identical to all signatures computed said plurality of receiving servers,
wherein said signature is computed in a same manner by said each server of the plurality of receiving servers,
such that said signature that is computed by a first server of the plurality of receiving servers is identical to said signature that is computed by a second server of the plurality of receiving servers;
sending by the each server, the signature that is computed to a synchronization component, the synchronization component being a separate server from said each server of the plurality of receiving servers;
receiving the signature that is sent and querying a signature database by the synchronization component to determine whether the signature that is received is stored in the signature database or not stored in the signature database,
wherein if a first condition is met that the signature that is received is not stored in the signature database, querying the signature database to store the signature that is received in the signature database and sending an instruction to store or an instruction to transmit the message that is received to the each server by the synchronization component,
wherein if the first condition is not met where the signature that is received is stored in the signature database, therefore the duplicate of the message is already stored in the signature database, querying the signature database to send a deletion instruction to the each server of the plurality of receiving servers, wherein said deletion instruction is an instruction to delete the message that is received that is the duplicate of the message and the signature that is computed based on the message that is received in said memory of said each server;
upon receipt of the instruction to store by the each server, storing by the each server the each message, that is received first based on the signature that is computed, on the storage device of the computing infrastructure,
upon receipt of the deletion instruction, deleting, by the each server of the plurality of receiving servers that sent the signature, the each message that is received and the signature that is computed corresponding thereto,
such that, duplicates of the message based on the signature that is computed received afterwards, are deleted,
wherein deletion of the message by the each server upon receiving the deletion instruction is to avoid several duplicates of the same identical message being stored or retransmitted in the computing infrastructure, to avoid the same identical message being considered as several identical independent messages, and to avoid said several identical independent messages being interpreted as a failure in the computing infrastructure.

2. The method according to claim 1, wherein said each message to be delivered is time-stamped.

3. The method according to claim 1, wherein said each message to be delivered is a message relating to an event that occurred in the computing infrastructure.

4. The method according to claim 1, wherein said computing the signature is carried out using a hashing algorithm.

5. The method according to claim 1, further comprising, upon receipt of the instruction to transmit by the each server, transmitting by the each server the each message that is received to a third-party component of the computing infrastructure.

6. The method according to claim 1, further comprising erasing at least a portion of the signature database at regular interval.

7. A computing infrastructure with message delivery management, comprising:
a storage device,
at least one transmitting component, at least one plurality of receiving servers,
at least one synchronization component, the at least one synchronization component being a server separate from each server of the at least one plurality of receiving servers, and
at least one signature database,
wherein the at least one transmitting component is configured to simultaneously send a message to said each server of the at least one plurality of receiving servers,
wherein each message of the message simultaneously sent to said each server
is associated via a piece of information relating to an origin of the each message, with a given transmitting component of the at least one transmitting component that is to send the each message, and
is associated via a piece of information relating to a destination of the each message, with a given plurality of receiving servers of said at least one plurality of receiving servers to which the each message is to be sent,
wherein the message that is sent simultaneously by the transmitting component is a same identical message with an identical timestamp and identical content sent to the each server of the at least one plurality of receiving servers,
such that said each server of the at least one plurality of receiving servers receives a duplicate of said message,
wherein the same identical message that is sent to all of the at least one plurality of receiving servers comprises the piece of information relating to the origin of the message from the transmitting component and the piece of information relating to the destination of the message from the at least one plurality of receiving servers, wherein said each server of the at least one plurality of receiving servers is configured to, upon receipt of said message sent by the at least one transmitting component, store the message that is received a memory of said each server, and compute a signature specific to the message that is received, wherein the signature that is computed is identical for said each server of the at least one plurality of receiving servers, and send the signature that is computed to the at least one synchronization component, wherein the at least one synchronization component is configured to receive each signature sent by said each server of the at least one plurality of receiving servers, to query the at least one signature database to determine whether said each signature that is received is stored in the at least one signature database or not stored in the at least one signature database, wherein if a first condition is met that the each signature that is received is not stored in the signature database, the at least one synchronization component is configured to query the at least one signature database to store in the at least one signature database said each signature that is received not stored in the at least one signature database, and to send a storage instruction or a transmission instruction to said each server that sent a signature not stored in the at least one signature database, wherein if the first condition is not met where the signature that is received is stored in the at least one signature database, therefore a duplicate of the message is already stored in the at least one signature database, querying the at least one signature database to send a deletion instruction to said each server that sent the signature stored in the at least one signature database, wherein said deletion instruction is an instruction to delete the message that is received that is the duplicate of the message and the signature that is computed based on the message that is received in said memory of said each server, upon receipt of the storage instruction to store, storing by the each server the each message, that is received first based on the signature that is computed, on the storage device of the computing infrastructure, upon receipt of the deletion instruction, deleting, by the each server of the at least one plurality of receiving servers that sent the signature, the each message that is received and the signature that is computed corresponding thereto, such that, duplicates of the message based on the signature that is computed received afterwards, are deleted, wherein deletion of the message by the each server upon receiving the deletion instruction is to avoid several duplicates of the same identical message being stored or retransmitted in the computing infrastructure, to avoid the same identical message being considered as several identical independent messages, and to avoid said several identical independent messages being interpreted as a failure in the computing infrastructure.

8. The computing infrastructure according to claim 7, wherein said each server of the at least one plurality of receiving servers being further configured to store the signature that is computed on the storage device upon receipt of the storage instruction sent by the at least one synchronization component.

9. The computing infrastructure according to claim 7, further comprising a third-party component, wherein said each server of the at least one plurality of receiving servers being further configured to transmit the message that is received to the third-party component upon receipt of the transmission instruction sent by the at least one synchronization component.

\* \* \* \* \*